(12) United States Patent
Marando (10) Patent No.: US 7,394,217 B2
(45) Date of Patent: Jul. 1, 2008

(54) DYNAMIC HYSTERESIS FOR AUTOFAN CONTROL

(75) Inventor: Eileen M. Marando, Bellmore, NY (US)

(73) Assignee: Standard Microsystems Corporation, Hauppauge, NY (US)

( * ) Notice: Subject to any disclaimer, the term of this patent is extended or adjusted under 35 U.S.C. 154(b) by 405 days.

(21) Appl. No.: 11/318,866

(22) Filed: Dec. 27, 2005

(65) Prior Publication Data

US 2007/0145934 A1 Jun. 28, 2007

(51) Int. Cl.
*G05B 11/28* (2006.01)
(52) U.S. Cl. .................. 318/599; 318/445; 318/453; 318/471
(58) Field of Classification Search ............ 318/599, 318/445, 453, 471
See application file for complete search history.

(56) References Cited

U.S. PATENT DOCUMENTS

| | | | |
|---|---|---|---|
| 4,722,669 A | 2/1988 | Kundert | |
| 4,727,468 A | 2/1988 | Maekawa | |
| 5,249,741 A | 10/1993 | Bistline et al. | |
| 5,307,439 A | 4/1994 | Enami | |
| 5,687,079 A | 11/1997 | Bauer et al. | |
| 5,727,928 A | 3/1998 | Brown | |
| 5,825,972 A | 10/1998 | Brown | |
| 5,942,866 A | 8/1999 | Hsieh | |
| 5,962,933 A | 10/1999 | Henderson et al. | |
| 5,990,582 A | 11/1999 | Henderson et al. | |
| 6,182,902 B1 | 2/2001 | Shih | |
| 6,188,189 B1 | 2/2001 | Blake | |
| 6,208,538 B1 | 3/2001 | Halamik et al. | |
| 6,226,324 B1 | 5/2001 | Allstrom | |
| 6,247,898 B1 | 6/2001 | Henderson et al. | |
| 6,262,549 B1 | 7/2001 | Yang et al. | |
| 6,519,167 B1 | 2/2003 | Nguyen | |
| 6,528,987 B1 | 3/2003 | Blake et al. | |
| 6,563,284 B2 | 5/2003 | Teutsch et al. | |
| 6,601,168 B1 | 7/2003 | Stancil et al. | |

(Continued)

OTHER PUBLICATIONS

Analog Devices, Publication ADM1027, "*dB*COOL™ Remote Thermal Controller and Voltage Monitor," 2003, 56 pages.

(Continued)

*Primary Examiner*—Karen Masih
(74) *Attorney, Agent, or Firm*—Meyertons Hood Kivlin Kowert & Goetzel, P.C.; Jeffrey C. Hood (57) ABSTRACT

A control signal value, such as a duty cycle value for a Pulse Width Modulated (PWM) generator output, for controlling and/or powering a fan may be calculated using an autofan function configured with dynamic hysteresis control (DHC). As part of the DHC, the PWM duty cycle value may be determined by applying a hysteresis component at every point of the autofan function relating the PWM duty cycle to temperature. The PWM duty cycle value may be computed based on two functions, each function relating the PWM duty cycle to temperature, the first function applied when the temperature is increasing, and the second function applied when the temperature is decreasing. When a newly computed PWM duty cycle value falls within a range of duty cycle values defined by the hysteresis value, the current duty cycle of the PWM generator output may remain unchanged, minimizing noise resulting from the fan changing speed.

20 Claims, 3 Drawing Sheets

U.S. PATENT DOCUMENTS

| | | |
|---|---|---|
| 6,650,074 B1 | 11/2003 | Vyssotski et al. |
| 6,661,679 B1 | 12/2003 | Yang et al. |
| 6,874,327 B1 | 4/2005 | Wahler et al. |
| 6,919,703 B2 | 7/2005 | Marando et al. |
| 6,933,697 B2 | 8/2005 | Marando et al. |
| 2003/0193307 A1 | 10/2003 | Burstein |
| 2004/0001542 A1 | 1/2004 | Miller, Jr. |
| 2004/0145273 A1* | 7/2004 | Khoury et al. ......... 310/316.03 |
| 2004/0234376 A1 | 11/2004 | Marando et al. |
| 2005/0040777 A1 | 2/2005 | Bekker |
| 2005/0156544 A1 | 7/2005 | Marando et al. |
| 2005/0186083 A1 | 8/2005 | Marando et al. |
| 2005/0238336 A1 | 10/2005 | Bekker |
| 2005/0256670 A1 | 11/2005 | Bekker et al. |

OTHER PUBLICATIONS

National Semiconductor Corporation, Publication LM63, "±1° C. Accurate Remote Diode Digital Temperature Sensor with Integrated Fan Control," Feb. 2003, 28 pages.

Stephen Ohr, "Analog IC vendors find 'Intel Inside' a safe bet," Sep. 12, 2002, printed from www.eetimes.com/story/OEG20020912S0026.

* cited by examiner

DYNAMIC HYSTERESIS FOR AUTOFAN CONTROL

BACKGROUND OF THE INVENTION

1. Field of the Invention

This invention relates to cooling equipment for electronic systems, e.g., fans, and more particularly, to controlling the rotational speed of a fan.

2. Description of the Related Art

Fans are often used to evacuate warm air from enclosures in which electronic systems are contained. For example, most computer systems include one or more cooling fans to aid in circulating the air inside the enclosures and for maintaining the temperature inside the enclosures within an acceptable range. The increased airflow provided by fans typically aids in eliminating waste heat that may otherwise build up and adversely affect system operation. Employing cooling fans is especially helpful in ensuring proper operation for certain central processing units (CPUs), memory units, and other elements with relatively high operating temperatures.

Control of fans in a system typically involves a fan control unit executing a fan control algorithm. A fan control algorithm may determine the method for controlling one or more fans that are configured to evacuate warm air from a system enclosure. For example, the fan control algorithm may specify that a fan's speed should be increased or decreased dependent upon a detected temperature. Such control algorithms may also involve turning off a fan if the temperature is deemed cool enough to do so.

For detecting the temperature, a temperature sensor may provide to the fan control unit a signal indicative of the present temperature of a particular temperature zone in the electronic system. Fan drive systems often use a signal generator that provides a Pulse Width Modulated (PWM) signal to either directly drive the fan or drive an external circuit that controls the voltage between the power and ground interfaces of the fan, which in turn controls the speed of the fan. Signal generators that provide PWM signals are useful because they provide a digital control for the pulse width of a signal. The fan is typically powered only for the duration of the pulse. Between pulses power to the fan is turned off, although the fan is typically still spinning during this time. The duty cycle of the PWM pulse train presently being provided to the fan determines the fan's speed.

One problem in fan control has been to quiet the acoustical effects of a fan when the fan is changing speed. In general, present cooling solutions revolve around identifying and approaching a quiescent thermal operating point where the temperature and fan speed become stable. While in theory this may be considered an adequate and workable solution, in reality the fan speeds and zone temperatures typically do not reach this point, requiring the fan speed to be constantly readjusted, potentially increasing system noise. Consequently, most cooling solutions today typically attempt to minimize the change in PWM but generally don't prevent the PWM duty cycle from changing when the temperature begins to stabilize and is oscillating around the quiescent thermal operating point. In fact, even subtle changes in the PWM duty cycle may be perceived by the user.

Other corresponding issues related to the prior art will become apparent to one skilled in the art after comparing such prior art with the present invention as described herein.

SUMMARY OF THE INVENTION

A system for controlling a fan may be configured to generate a control signal value for controlling the fan, such as a duty cycle value for a Pulse Width Modulated (PWM) generator output controlling/powering the fan. The value of the control signal may be calculated using an autofan function configured with dynamic hysteresis control (DHC). In one embodiment, as part of the DHC, the PWM duty cycle value is determined by applying a hysteresis component at every point of the autofan function relating the PWM duty cycle to temperature. The PWM duty cycle value may be computed based on two functions that each relate the PWM duty cycle to temperature, and the first function is applied when the temperature is increasing while the second function is applied when the temperature is decreasing. When a newly computed PWM duty cycle value falls within a range of duty cycle values defined by the hysteresis value, a current PWM duty cycle value of the PWM generator output may remain unchanged.

In one set of embodiments, a system for controlling a fan, or multiple fans, may include at least one input configured to receive sensor data, and a logic block configured to process the sensor data. The sensor data may include temperature information, and a control output, for example a PWM output for controlling and/or powering the fan, may be generated through the logic block. The logic block may also be configured to calculate a PWM duty cycle based on a present reading of the sensor data, and to calculate the PWM duty cycle according to a first function if the present reading of the sensor data has a greater value than the most recent previously processed reading of the sensor data. Upon having calculated the PWM duty cycle according to the first function, the logic block may operate to change the PWM output only if the calculated PWM duty cycle is greater than the present duty cycle of the PWM output. If the present reading of the sensor data has a lesser value than the most recent previously processed reading of the sensor data, the logic block may operate to calculate the PWM duty cycle according to a second function, and change the PWM output only if the calculated PWM duty cycle is lesser than the present duty cycle of the PWM output.

In some embodiments, if the PWM duty cycle was calculated according to the first function, and if the calculated PWM duty cycle is greater than the present duty cycle of the PWM output, the logic block may increase the present duty cycle of the PWM output by a specified amount, or set the present duty cycle of the PWM output to the calculated PWM duty cycle. Similarly, if the PWM duty cycle was calculated according to the second function, and if the calculated PWM duty cycle is lesser than the present duty cycle of the PWM output, the logic block may decrease the present duty cycle of the PWM output by a specified amount or set the present duty cycle of the PWM output to the calculated PWM duty cycle. The system may further include one or more additional inputs, with each input configured to receive respective additional sensor data. In such embodiments, the logic block may be further configured to calculate the PWM duty cycle based on the collective respective present readings of all the sensor data. In addition to temperature information, the sensor data may also include tachometer readings, acoustic (noise) inputs, and so forth.

In one set of embodiments, a method for computing a control value for controlling a fan, or multiple fans, may include receiving a temperature reading, indicating whether the temperature is increasing, and computing a control value according to the temperature reading. The control value— which may be the duty cycle value for a PWM generator output, or may be the value for a DC voltage—may be calculated according to a first function if an increasing temperature is indicated, and according to a second function if the indication is of the temperature not increasing. Subsequently, the value of the control output, which may be used to control/power the fan, may be set to the newly computed control value only if the newly computed control value is greater than or equal to a present value of the control output for increasing temperature, and/or the newly computed control value is less than or equal to the present value of the control output for non-increasing temperature.

Other aspects of the present invention will become apparent with reference to the drawings and detailed description of the drawings that follow.

BRIEF DESCRIPTION OF THE DRAWINGS

The foregoing, as well as other objects, features, and advantages of this invention may be more completely understood by reference to the following detailed description when read together with the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not to be used to limit or interpret the description or claims. Furthermore, note that the word "may" is used throughout this application in a permissive sense (i.e., having the potential to, being able to), not a mandatory sense (i.e., must)." The term "include" and derivations thereof mean "including, but not limited to". The term "coupled" means "directly or indirectly connected".

DETAILED DESCRIPTION OF THE PREFERRED EMBODIMENTS

Fan speed control systems often control a fan with a PWM (pulse width modulated) signal generated by a PWM signal generator. The signal generator receives PWM signal parameters from a calculation of the PWM signal at a particular time. One of the PWM signal parameters is "duty cycle." The duty cycle of a PWM signal is the ratio of the amount of time that the PWM signal is asserted to being non-asserted. For example, a PWM signal having a 50% duty cycle is understood to be a PWM signal asserted half the time. The greater the PWM duty cycle, the faster the fan operates, and thus, the greater the air movement is in the fan speed control system. For example, a 100% duty cycle produces a PWM signal that powers the fan at a maximum, whereas a 0% duty cycle produces a PWM signal that turns the fan off. The terms "PWM value" and "PWM duty cycle value" are both used herein to refer to "PWM duty cycle value".

Figure 1:
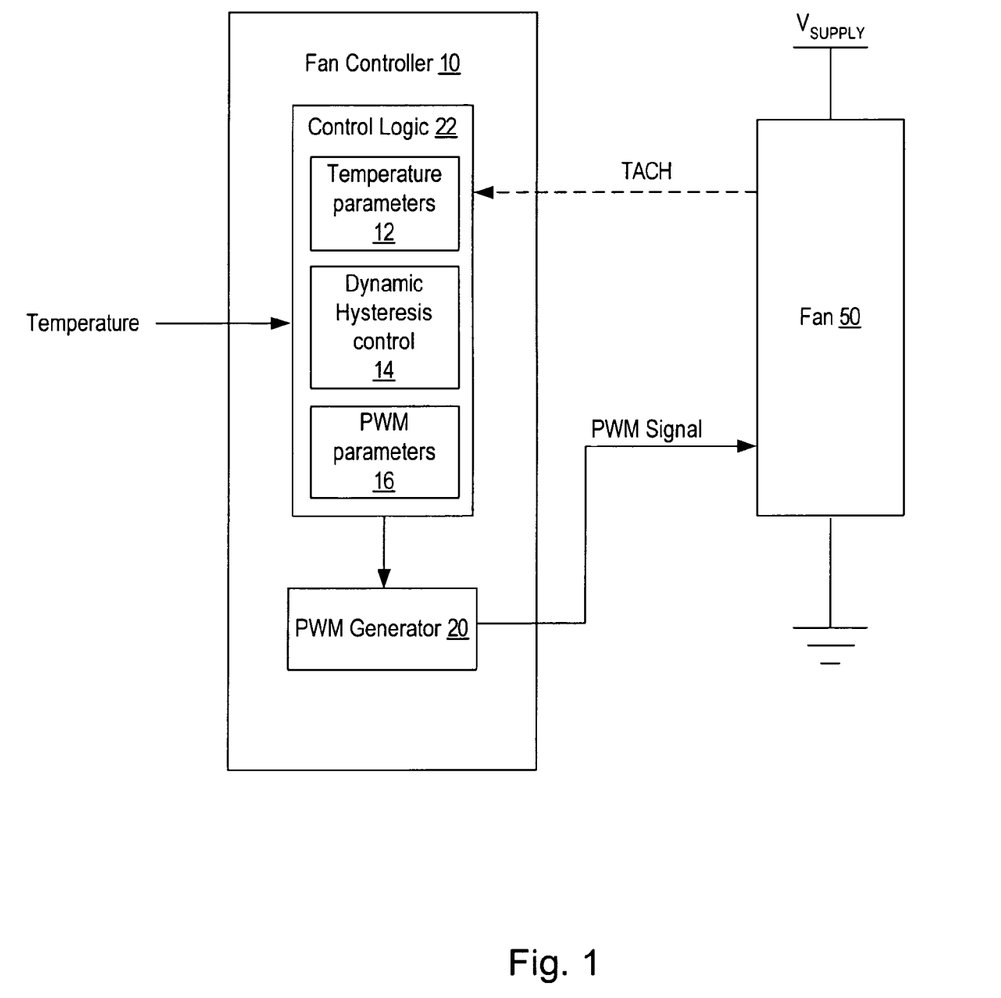
FIG. 1 illustrates one embodiment of an autofan control system according to the present invention.

FIG. 1 shows an embodiment of a system for powering a fan with a PWM (Pulse Width Modulated) signal. This system includes a controller 10 and a fan 50. A PWM signal generated by fan controller 10 may control whether fan 50 is turned on or not. This system may be included in an enclosure containing various electronic devices. For example, this system may be included in a desktop computer chassis or a storage array enclosure.

Fan controller 10 may include control logic 22 and a PWM (Pulse Width Modulator) generator 20 configured to generate the PWM signal. Control logic 22 may be configured to provide a value indicative of the duty cycle to the PWM generator 20. In one embodiment, the PWM generator 20 is configured to responsively generate the PWM signal (labeled "PWM Signal" in FIG. 1) with a duty cycle according to the duty cycle value indicated by control logic 22. PWM generator 20 is an example of a means for powering fan 50 according to a PWM signal having a duty cycle dependent on a duty cycle value, and control logic 22 is an example of a means for generating a duty cycle value according to a function relating the PWM duty cycle to temperature, for example a linear equation or an equation for a parabola.

Fan 50 may comprise two ports (power and ground) or three ports (power, ground, and tachometer) in some embodiments. In some embodiments in which fan 50 has three ports, fan controller 10 may generate the PWM signal dependent on a fan tachometer signal, labeled in FIG. 1 as "TACH". In alternate embodiments fan 50 may comprise additional ports as corresponding to various fan design technologies.

In some embodiments, the PWM signal may be input to fan drive circuitry (not shown) such as a switch. For example, fan drive circuitry may include a switch coupled between the ground input of fan 50 and ground. When the PWM signal is high, the switch may close, connecting the ground interface of fan 50 to ground. When the PWM signal is low, the switch may open, creating an open circuit between the ground interface of the fan 50 and ground. Accordingly, opening the switch by deasserting the PWM signal may turn off the power to the fan 50. Note that the PWM signal may be an active high or an active low signal. For example, if the switch is implemented using a PNP transistor, the switch may close when the PWM signal is low. In such an embodiment, the switch may be coupled to the power interface of fan 50 (as opposed to the ground interface) between the power interface and the power source. When the switch is closed, the power interface of fan 50 may connect to the power source, turning on fan 50. Note that other embodiments may include different fan drive circuitry or no fan drive circuitry at all (e.g., the PWM signal may be input directly to one of the fan's input terminals).

As the duty cycle (the ratio of the time in which the PWM signal is asserted to the time in which the PWM signal is deasserted) of the PWM signal increases, the fan is powered for a greater percentage of time each cycle. Consequentially, the fan speed increases. Similarly, as the duty cycle decreases, the fan speed decreases. Thus, fan controller 10 may control the speed of fan 50 by varying the duty cycle of the PWM signal.

Fan controller 10 may receive an indication of the present temperature (e.g., by detecting the present temperature itself or by receiving a digital or analog signal representing the temperature detected by another device) and control the fan speed dependent on the present temperature. As the temperature increases, fan controller 10 may increase the fan speed in order to provide increased cooling. If the temperature decreases, the fan controller 10 may decrease the fan speed. If the temperature stabilizes, fan controller 10 may keep the fan speed the same. Note that in many embodiments, fan controller 10 may vary the duty cycle of the PWM signal according to other parameters in addition to the present temperature. For example, in some embodiments, fan controller 10 may detect both the present temperature and the rate of temperature change experienced in the most recent period. In such embodiments, fan controller 10 may be configured to selectively vary the duty cycle of the PWM signal less at higher values of the temperature if the temperature is stabilizing than if the temperature is increasing. Other parameters may also affect how fan controller 10 modifies the duty cycle of the PWM signal.

In one embodiment, control logic 22 includes registers or set of registers 12 and 16 that store values used by control logic 22 in calculating the appropriate duty cycle of the PWM signal. In some embodiments, registers 12 may store temperature parameters, such as minimum temperature and/or temperature range, and registers 16 may store PWM duty cycle parameters such as minimum PWM duty cycle value and/or maximum PWM duty cycle value. In one embodiment, control logic 22 also includes a dynamic hysteresis control (DHC) logic block 14 configured to allow the duty cycle of the PWM signal to change only when there has been a significant change in temperature. In other words, DHC logic block 14 may ensure that a PWM duty cycle becomes stable in a quiescent thermal range, rather than at a specified quiescent thermal operating point. DHC logic block 14 may effectively enable fan controller 10 to adapt to its environment by allowing each fan in its respective thermal zone to find a stable operating range when the temperature is relatively static.

As previously mentioned, the duty cycle value of the PWM signal may be determined by control logic 22 according to a function relating the PWM duty cycle to temperature. In one set of embodiments, DHC 14 operates to apply the hysteresis component at every point on the function relating PWM duty cycle to temperature. It should be noted again that the function could be a linear function, non-linear function, or any other method implemented that derives a series of points used to control a PWM output. By applying the hysteresis component at every point on the line or curve representing the function relating the PWM duty cycle to temperature, fan noise resulting from changes in fan speed may be greatly reduced and/or minimized.

Figure 2:
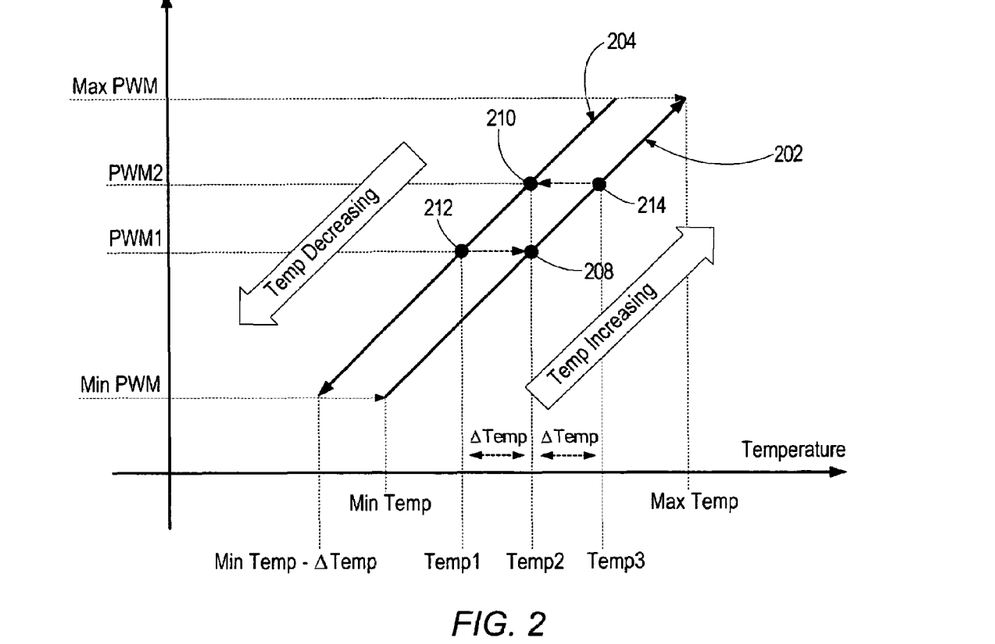
FIG. 2 shows one example of the hysteresis being applied at every point on a linear function relating the PWM duty cycle value to temperature.

FIG. 2 shows one example of the hysteresis being applied at every point on a linear function relating the PWM duty cycle value to temperature. When the temperature is increasing, the PWM value may be computed based on parameters that have been defined for the linear function represented by line 202. When the temperature is decreasing, the PWM value may be computed based on parameters that have been defined for the linear function represented by line 204. In one embodiment, when the PWM value is computed based on line 202, and the newly computed PWM value is greater than the present (previously computed) PWM value, then the PWM duty cycle is increased by a delta PWM value as determined by the autofan algorithm implemented by control logic 22. If the calculation based on line 202 results in a new PWM value that is less than or equal to the present (previously computed) PWM value, then the PWM duty cycle may remain unchanged. Conversely, when the PWM value is computed based on line 204, and the newly computed PWM value is less than the present (previously computed) PWM value, then the PWM duty cycle may be decreased by a delta PWM value as determined by the autofan algorithm implemented by control logic 22. If the calculation based on line 204 results in a new PWM value that is greater than or equal to the present (previously computed) PWM value, then the PWM duty cycle may again remain unchanged.

For example, Temp3 may represent a present temperature that has been reached as a result of previously increasing temperature. If the temperature now begins to decrease from Temp3, the arrow from node 214 to 210 may indicate the hysteresis temperature. Similarly, Temp1 may represent a present temperature that has been reached as a result of previously decreasing temperature. If the temperature no begins to increase from Temp1, the arrow from node 212 to 208 may indicate the hysteresis temperature. The hysteresis temperature is also shown as ΔTemp, and represents the temperature variation—either from previously increasing to decreasing temperature, or from previously decreasing to increasing temperature—within which the PWM signal may remain unchanged. Those skilled in the art will appreciate that while the concepts of defining a hysteresis temperature range described above are in reference to linear fan control solutions, the same concepts may be applied to functions and/or function curves representing non-linear solutions.

In one set of embodiments, for example when only a single thermal input is configured, or readings are received from a single temperature sensor, each new temperature reading may be compared to the previous temperature reading (where a temperature reading may be used to compute the PWM duty cycle). As previously mentioned, line 202 may represent a linear fan control algorithm. Dynamic hysteresis may be implemented as an extension of the linear fan control algorithm. If the temperature has been increasing, the PWM duty cycle may be computed based on parameters programmed according to the linear fan control algorithm represented by line 202. If the new temperature reading is greater than the previous temperature reading minus hysteresis temperature, the PWM duty cycle may remain unchanged, the previous temperature reading may be retained, and the new temperature reading may be discarded. If the new temperature reading is less than or equal to the previous temperature reading minus hysteresis temperature, then the PWM duty cycle may be determined by the corresponding point on line 204 for the temperature corresponding to the new temperature reading.

As long as the temperature is decreasing, the PWM duty cycle value may be computed based on line 204. If the temperature increases, but is less than the present temperature plus hysteresis temperature, the PWM duty cycle value may remain unchanged, and this turning point temperature reading may be stored as the previous temperature reading against which to compare future temperature readings. Each new temperature reading may be compared to this previous temperature reading until either a new temperature reading is less than the stored previous temperature reading, or greater than the previous temperature reading plus hysteresis temperature. If the new temperature reading is greater than the previous temperature reading plus hysteresis temperature, then the PWM duty cycle may be determined by the corresponding point on line 202 for the temperature corresponding to the new temperature reading.

In alternate embodiments, for example when more than a single thermal input is configured, or when readings are received from multiple temperature sensors, the temperature comparisons may be performed based on the relative hottest one of all the temperature readings. Referring again to function 202, by way of example, if the temperature has been increasing (and is possibly currently unchanging), the computed PWM value at Temp3 may be PWM2 situated on line 202, represented by node 214. PWM2 may also be the present duty cycle of the PWM signal. If the temperature now begins to decrease, moving from Temp3 towards Min Temp on the Temperature axis, a new PWM value may be computed based on line 204 according to a respective temperature value on the Temperature axis corresponding to each new temperature reading. With continually decreasing temperature, any newly computed PWM value along line 204 that remains greater than or equal to PWM2 may result in the present duty cycle of the PWM signal being held at PWM2. If the temperature reaches Temp2, the newly computed PWM value will again be PWM2, this time represented by node 210. If the temperature subsequently falls below Temp2, the newly computed PWM value will be lower than PWM2, resulting in the duty cycle of the PWM signal being decreased by a delta PWM value as determined by the autofan algorithm implemented by control logic 22.

The same process may be illustrated for the case when previously decreasing (and possibly currently unchanging) temperature begins to increase. Referring again to function 204, by way of example, if the temperature has been decreasing (and is possibly currently unchanging), the computed PWM value at Temp1 may be PWM1 situated on line 204, represented by node 212. PWM1 may also be the present duty cycle of the PWM signal. If the temperature now begins to increase, moving from Temp1 towards Max Temp on the Temperature axis, a new PWM value may be computed based on line 202 according to a respective temperature value on the Temperature axis corresponding to each new temperature reading. With continually increasing temperature, any newly computed PWM value along line 202 that remains less than or equal to PWM1 may result in the present duty cycle of the PWM signal being held at PWM1. If the temperature reaches Temp2, the newly computed PWM value will again be PWM1, this time represented by node 208. If the temperature subsequently rises above Temp2, the newly computed PWM value will be greater than PWM1, resulting in the duty cycle of the PWM signal being increased by a delta PWM value as determined by the autofan algorithm implemented by control logic 22. As previously mentioned, the temperature period ΔTemp between Temp1 and Temp2 and between Temp2 and Temp3 defines the temperature range within which a given duty cycle value of the PWM output may remain unchanged when previously increasing (and possibly currently stable) temperature begins to decrease, or previously decreasing (and possibly currently stable) temperature begins to increase.

Figure 3:
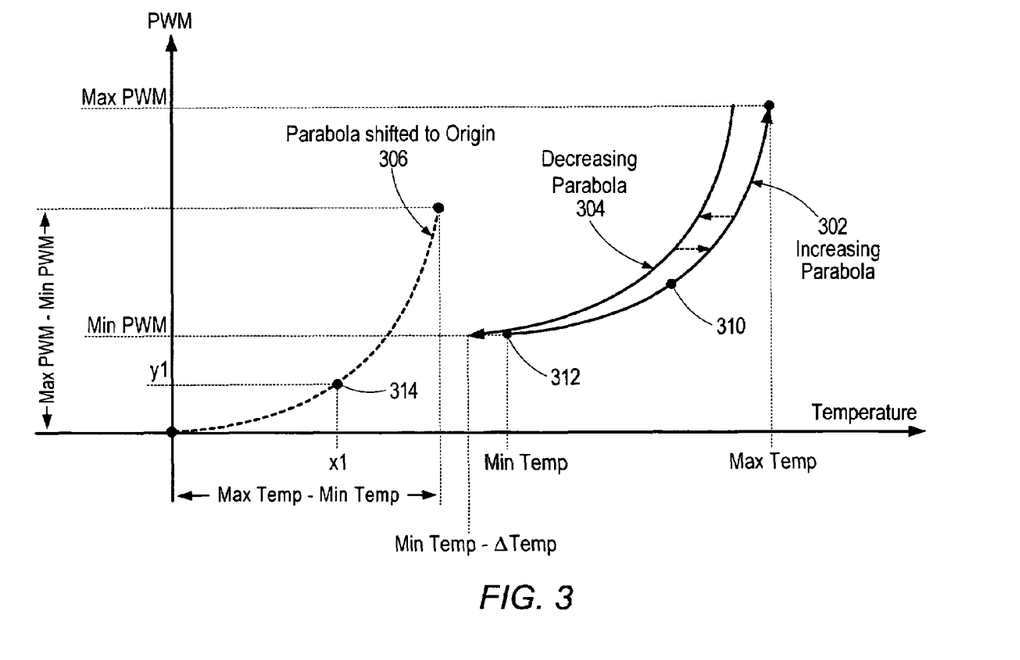
FIG. 3 is an illustration of the concept of applying the hysteresis range to a non-linear fan control solution.

FIG. 3 is an illustration of the concept of applying the hysteresis temperature to a non-linear fan control solution. More specifically, FIG. 3 shows a hysteresis temperature being applied to a parabolic solution. Similarly to the embodiment shown in FIG. 2, when the temperature is increasing (Increasing Parabola), the PWM value may be computed based on parameters that have been defined for the parabolic function represented by curve 302. When the temperature is decreasing (Decreasing Parabola), the PWM value may be computed based on parameters that have been defined for the parabolic function represented by line 304. Again, when the PWM value is computed based on curve 302, and the newly computed PWM value is greater than the previously computed PWM value, then the PWM duty cycle may be increased by a delta PWM value as determined by the autofan algorithm implemented by control logic 22. If the calculation based on curve 302 results in a new PWM value that is less than or equal to the previously computed PWM value, then the PWM duty cycle may remain unchanged. Conversely, when the PWM value is computed based on curve 304, and the newly computed PWM value is less than the previously computed PWM value, then the PWM duty cycle may be decreased by a delta PWM value as determined by the autofan algorithm implemented by control logic 22. If the calculation based on curve 304 results in a new PWM value that is greater than or equal to the previously computed PWM value, then the PWM duty cycle may again remain unchanged.

In the embodiments shown in FIG. 2 and FIG. 3, decreasing curves 204 and 304 are of the same form as increasing curves 206 and 306, respectively. However, the concept of applying the hysteresis temperature is not limited to applying it to a single function in order to affect the resulting PWM value. The hysteresis temperature may be applied to multi-segmented solutions, for example a piece-wise linear solution [see application incorporated by reference]. Furthermore, while the hysteresis temperature shown in FIG. 2 and FIG. 3 (ΔTemp in FIG. 2) is identical between corresponding points on the respective increasing function curves in relation to the respective decreasing function curves, it may be desirable in certain embodiments to apply greater hysteresis temperature in the lower temperature ranges and lower hysteresis temperature in the higher temperature ranges. Therefore, in some embodiments, the hysteresis temperature value itself may be a function of temperature and/or a function of the PWM value.

Figure 4:
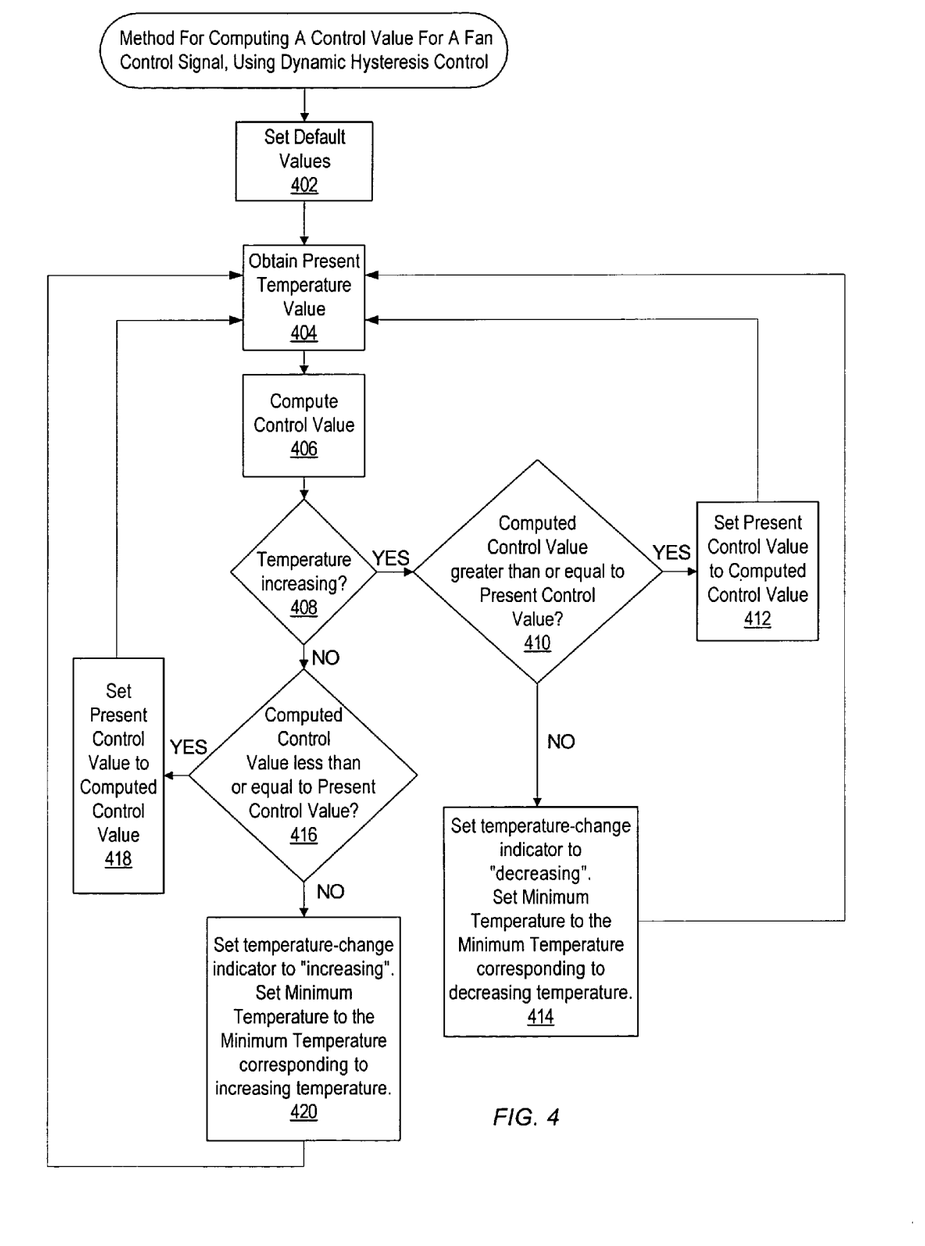

FIG. 4 shows a flow diagram of one method for computing a control value, for example a PWM duty cycle, for a fan control signal, for example a PWM signal, using dynamic hysteresis control. Various default values may be set (402) prior to obtaining a temperature reading (404). In one set of embodiments, default values may be set for a present control value, a temperature change indicator specifying the direction of the temperature change (increasing or decreasing), a present temperature value, a minimum temperature value corresponding to increasing temperature, a minimum temperature value corresponding to decreasing temperature, and a present minimum temperature. In one set of embodiments, prior to setting the default values, a minimum temperature value may be programmed, where the programmed minimum temperature value may represent either the minimum temperature value corresponding to increasing temperature or the minimum temperature value corresponding to decreasing temperature. Depending on which of those two values is represented by the programmed minimum temperature value, the other value may be determined by subtracting or adding a hysteresis temperature value from/to the programmed minimum temperature value, respectively, when setting the default values. For example, if the programmed minimum temperature value represents the minimum temperature value corresponding to increasing temperature, the minimum temperature value corresponding to decreasing temperature may be set (during step 402) by subtracting a hysteresis temperature value from the programmed minimum temperature value, and the minimum temperature value corresponding to increasing temperature may simply be set to the programmed minimum temperature value.

After having obtained a present temperature value (404), a control value, which in some embodiments may be a PWM duty cycle, may be computed according to the present temperature value (406) and the present minimum temperature value. The direction of the temperature change may then be evaluated according to the value of the temperature change indicator (408), and if the temperature change indicator indicates an increasing temperature, the computed control value may be compared against a present control value (410). If the computed control value is found to be greater than or equal to the present control value, the present control value may be set to the computed control value (412), and the present temperature value may be obtained again (404). Otherwise, a temperature-change indicator may be set to indicate a decreasing temperature, and the present minimum temperature value may be set to the minimum temperature value corresponding to decreasing temperature, followed by obtaining the present temperature value (404).

If the evaluation in step 408 indicates a decreasing or unchanging temperature, and the computed control value is indicated to be less than or equal to the present control value (416), the present control value may be set to the computed control value, and the present temperature value may be obtained (404). If the evaluation in step 408 indicates a decreasing or unchanging temperature, and the computed control value is indicated to be greater than the present control value (416), the temperature-change indicator may be set to indicate an increasing temperature, the present minimum temperature value may be set to the minimum temperature value corresponding to increasing temperature, and the present temperature value may be obtained (404).

It should be noted that in alternate embodiments where only a single temperature input value is used to determine the control value, 406 may not be required. In such embodiments, instead of comparing the control values (in 410 and/or in 416), the present temperature value may be compared to a most recent preceding temperature value. Thus in 410, the assessment may be made whether the present temperature value is greater than or equal to the most recent preceding temperature value, and in 416 the assessment may be made whether the present temperature value is less than or equal to the most recent preceding temperature value. Accordingly, a computation of the control value may be performed in conjunction with, or as part of, 412 and/or 418. Also, in certain embodiments, the algorithm shown in FIG. 4, with the exception of 402, may be executed at least twice during a temperature-sampling period. For example, if a temperature sensor is configured to provide temperature updates every 10 milliseconds, the algorithm (except 402) may be performed at least twice within a 10 millisecond time period.

One of the advantages of configuring fan controller 10 with dynamic hysteresis control 14, as opposed to other methods of fine-tuning the generation of the PWM value, is the ability to keep the PWM value static until enough of a temperature difference is detected. For example, adding additional temperature resolution instead of DHC 14 may allow for finer PWM adjustments, but the PWM may still change even for small changes in temperature. The temperature may be oscillating around a ½ of a degree, which might cause the PWM value to oscillate between two calculated PWM values, possibly generating noise that is detectable to the human ear. For example, if the Temperature Range is set for 2 degrees, with a ¼ degree resolution, and the PWM is set for the full range (0-255), the PWM output may change by 12.5% (max). Such fractional changes in temperature may be effectively filtered by DHC 14.

It should also be noted that while the preferred embodiments include calculating and determining PWM duty cycle values, control values corresponding to other means of fan control may also be calculated by applying dynamic hysteresis temperature control as previously described. Those skilled in the art will recognize, for example, that computing voltage values for voltage controlled fans may be performed in a manner consistent with the principles set forth herein, and any control signal for controlling a fan may generated by applying dynamic hysteresis control to a function, (or autofan function) relating temperature to the control signal.

Having thus described the invention and the manner of its use, a system and method was presented for controlling a fan by employing dynamic hysteresis control. Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

We claim:

1. A system for controlling at least one fan, the system comprising:

at least one input operable to receive first sensor data; and a logic block configured to process the sensor data, wherein the logic block is further configured to provide a Pulse Width Modulated (PWM) output for controlling the at least one fan;

wherein the logic block is operable to calculate a PWM duty cycle based on a present one of the first sensor data;

wherein if the present one of the first sensor data has a greater value than a most recent previously processed one of the first sensor data, the logic block is operable to calculate the PWM duty cycle according to a first function; and wherein if the PWM duty cycle was calculated according to the first function, the logic block is operable to change the PWM output only if the calculated PWM duty cycle is greater than a present duty cycle of the PWM output.

2. The system of claim 1, wherein if the PWM duty cycle was calculated according to the first function, and if the calculated PWM duty cycle is greater than the present duty cycle of the PWM output, the logic block is operable to perform one or more of the following:

increase the present duty cycle of the PWM output by a specified amount; and set the present duty cycle of the PWM output to the calculated PWM duty cycle.

3. The system of claim 1, wherein if the present one of the first sensor data has a lesser value than the most recent previously processed one of the first sensor data, the logic block is operable to calculate the PWM duty cycle according to a second function;

wherein if the PWM value was calculated according to the second function, the logic block is operable to change the PWM output only if the calculated PWM duty cycle is lesser than the present duty cycle of the PWM output.

4. The system of claim 3, wherein if the PWM duty cycle was calculated according to the second function, and if the calculated PWM duty cycle is lesser than the present duty cycle of the PWM output, the logic block is operable to perform one ore more of the following:

decrease the present duty cycle of the PWM output by a specified amount; and set the present duty cycle of the PWM output to the calculated PWM duty cycle.

5. The system of claim 1, wherein the first function and the second function have the same form.

6. The system of claim 1, wherein the first function and the second function both comprise one of:

a linear function; and a parabolic function.

7. The system of claim 1, further comprising one or more additional inputs, each input configured to receive respective additional sensor data, wherein the logic block is operable to calculate the PWM duty cycle based on:

the present one of the first sensor data; and a respective present one of each respective additional sensor data.

8. The system of claim 7, wherein the first sensor data comprise temperature values and at least one of the respective additional sensor data comprise tachometer reading values.

9. The system of claim 1, wherein in providing a PWM output for controlling the at least one fan, the logic block is operable to power the at least one fan.

10. A system for controlling at least one fan, the system comprising:
   at least one input operable to receive sensor data; and
   a logic block configured to process the sensor data, wherein the logic block is further configured to provide a control output for controlling the at least one fan;
   wherein the logic block is operable to calculate a control value based on a present one of the sensor data;
   wherein if the present one of the sensor data has a greater value than a most recent previously processed one of the sensor data, the logic block is operable to calculate the control value according to a first function; and
   wherein if the present one of the first sensor data has a lesser value than the most recent previously processed one of the first sensor data, the logic block is operable to calculate the control value according to a second function;
   wherein if the control value was calculated according to the first function, the logic block is operable to change the control output only if the calculated control value is greater than a present value of the control output.
   wherein if the control value was calculated according to the second function, the logic block is operable to change the control output only if the calculated control value is lesser than the present value of the control output.

11. The system of claim 10, wherein the logic bock is operable to perform one or more of the following:
   if the control value was calculated according to the first function, and if the calculated control value is greater than the present value of the control output, increase the present value of the control output by a specified amount; and
   if the control value was calculated according to the second function, and if the calculated control value is less than the present value of the control output, decrease the present value of the control output by a specified amount.

12. The system of claim 10, wherein the logic block is operable to set the present value of the control output to the calculated control value, if one or more of the following is true:
   the control value was calculated according to the first function, and the calculated control value is greater than the present value of the control output; and
   the control value was calculated according to the second function, and the calculated control value is less than the present value of the control output.

13. A method for computing a control value for controlling at least one fan, the method comprising:
   receiving a data value from a sensor;
   computing a control value according to the data value; and
   setting a value of a control output to the control value only if:
      the data value is greater than a previous data value most recently received from the sensor, and the computed control value is greater than or equal to a present value of the control output; and/or
      the data value is not greater than the previous data value most recently received from the sensor, and the computed control value is less than or equal to the present value of the control output;
   wherein the control output is operable to control a rotational speed of at least one fan.

14. The method of claim 13, further comprising controlling the at least one fan through the control output.

15. The method of claim 14, wherein said controlling comprises powering the at least one fan.

16. The method of claim 13, further comprising performing said receiving, said computing, and said setting for a plurality of data values.

17. The method of claim 13, wherein the sensor comprises a temperature sensor.

18. The method of claim 13, wherein the control value comprises a PWM duty cycle, and the control output comprises a PWM output.

19. The method of claim 13, further comprising:
   receiving one or more additional data values from respective one or more additional sensors;
   wherein said computing comprises computing the control value according to the data value and the additional one or more data values.

20. A method for computing a control value for controlling at least one fan, the method comprising:
   receiving a temperature value;
   indicating whether the temperature is increasing;
   computing a control value according to the temperature value and one of:
      a first function if according to said indicating the temperature is increasing; and
      a second function if according to said indicating the temperature is not increasing;
   setting a value of a control output to the control value only if:
      according to said indicating the temperature is increasing, and the computed control value is greater than or equal to a present value of the control output; and/or
      according to said indicating the temperature is not increasing, and the computed control value is less than or equal to the present value of the control output;
   wherein the control output is operable to control a rotational speed of at least one fan.

* * * * *